United States Patent
Waldal

(10) Patent No.: US 7,284,920 B2
(45) Date of Patent: Oct. 23, 2007

(54) PRINTING DEVICE

(75) Inventor: Douglas Waldal, Stamford, CT (US)

(73) Assignee: Sanford, L.P., Oak Brook, IL (US)

( * ) Notice: Subject to any disclaimer, the term of this patent is extended or adjusted under 35 U.S.C. 154(b) by 160 days.

(21) Appl. No.: 10/933,258

(22) Filed: Sep. 3, 2004

(65) Prior Publication Data

US 2005/0117949 A1 Jun. 2, 2005

(30) Foreign Application Priority Data

Oct. 30, 2003 (GB) ................................. 0325419.0

(51) Int. Cl.
*B41J 11/44* (2006.01)
(52) U.S. Cl. ..................... 400/76; 400/62; 400/615.2
(58) Field of Classification Search ................. 400/61, 400/62, 70, 76, 611–615.2; 358/1.11, 1.9, 358/1.15–1.18
See application file for complete search history.

(56) References Cited

U.S. PATENT DOCUMENTS

| 5,559,934 | A | * | 9/1996 | Ogura et al. ................ 358/1.18 |
| 5,575,573 | A | | 11/1996 | Ito et al. ......................... 400/76 |
| 5,609,424 | A | | 3/1997 | Sakuragi et al. ............... 400/61 |
| 5,933,589 | A | | 8/1999 | Hidaka et al. ............. 358/1.18 |
| 6,793,422 | B2 | * | 9/2004 | Kurashina ................ 400/615.2 |
| 2004/0036915 | A1 | * | 2/2004 | Vleurinck et al. ......... 358/1.18 |

FOREIGN PATENT DOCUMENTS

| EP | 267890 | 5/1988 |
| EP | 322918 | 7/1989 |
| EP | 322919 | 7/1989 |
| EP | 0513290 | 6/1992 |
| EP | 0 574 657 | 12/1993 |
| EP | 578372 | 1/1994 |
| EP | 634274 | 1/1995 |
| EP | 0 760 291 A2 | 3/1997 |
| EP | 1 120 263 | 8/2001 |
| GB | 2 314 957 A | 1/1998 |
| GB | 2 388 573 A | 11/2003 |
| WO | 03/034329 | 4/2003 |

OTHER PUBLICATIONS

Search Report for Application No. GB 0325419.0, dated May 19, 2004 (1 page).
Examination Report for Application No. GB 0325419.0, dated Sep. 29, 2006 (3 pages).

* cited by examiner

*Primary Examiner*—Minh Chau
(74) *Attorney, Agent, or Firm*—Marshall, Gerstein & Borun LLP

(57) ABSTRACT

A printing device for printing labels includes: a read-only memory in which are stored a plurality of label data entries, the label data entries having been preset according to an intended use and are unalterable by a user; a user input having character selection keys and a plurality of direct access keys for selectively accessing respective label data entries, wherein direct access can mean a single access key activation; a writable memory for holding information selected by a user at the user input means including any label data entry accessed by one of the direct access keys; and a controller for accessing one of said label data entries responsive to selection of one of said direct access keys by a user and arranged to cause printing of a label using said label data entry.

39 Claims, 12 Drawing Sheets

Fig. 8
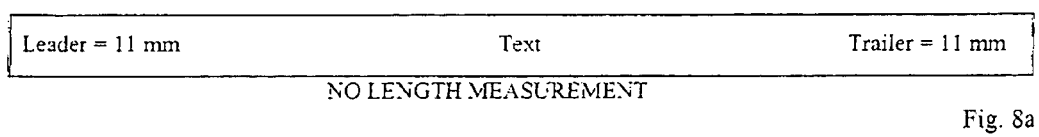
NO LENGTH MEASUREMENT
Fig. 8a
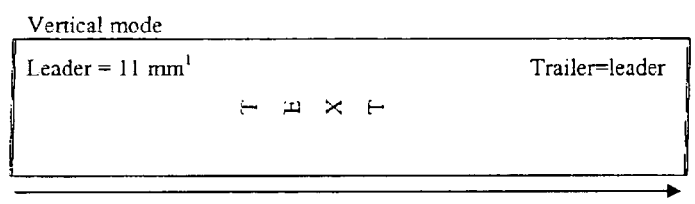
LENGTH MEASUREMENT = L
Fig. 8b
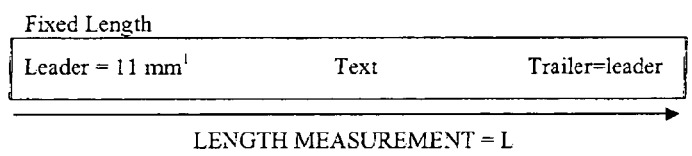
LENGTH MEASUREMENT = L
Fig. 8c Fig. 9
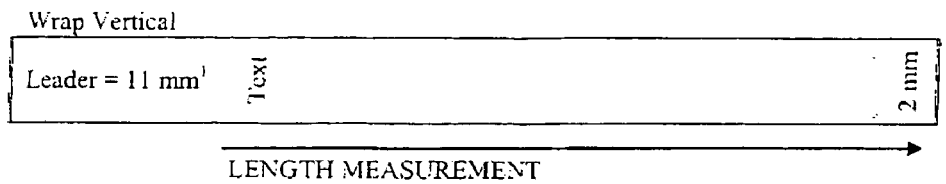
Fig. 9a
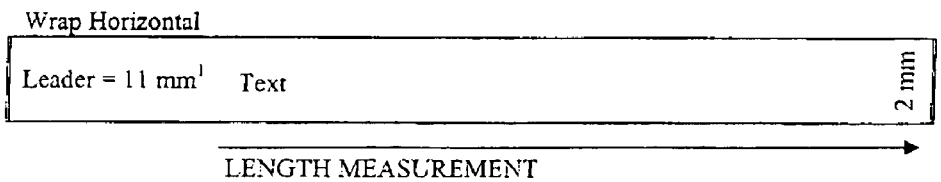
Fig. 9b
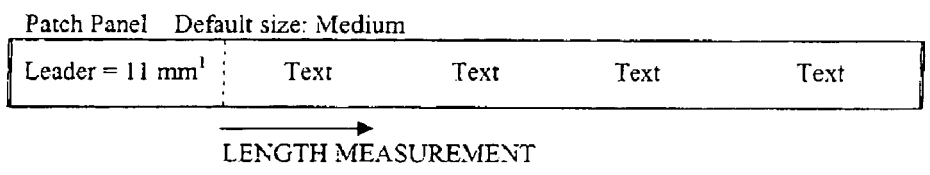
Fig. 9c
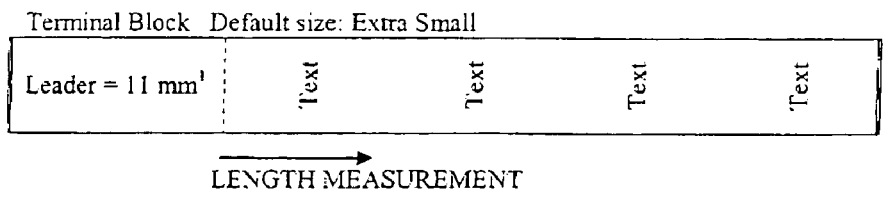
Fig. 9d

PRINTING DEVICE

FIELD OF THE INVENTION

The present invention relates to a printing device for printing labels or images and a method of printing labels, and in particular but not exclusively to a tape printing device.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

RELATED APPLICATIONS

This application claims priority to Great Britain Application GB 0325419.0 filed Oct. 30, 2003.

RELATED ART

Known tape printing apparatus of the type with which the present invention is concerned are disclosed in EP-A-322918 and EP-A-322919 (Brother Kogyo Kabushiki Kaisha) and EP-A-267890 (Varitronic). The printers each include a printing device having a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

There are also known thermal printing devices which print onto an image receiving tape by direct thermal transfer. Such devices do not require an ink ribbon.

The devices of the type described above are provided with a keyboard which enables a user to enter characters, symbols and the like to form an image to be printed by the tape printer. The keyboard usually has text character keys and number keys for entering letters and number keys respectively, plus some function keys which, among other things, operate menus and allow printing attributes to be set.

For many applications a user of such printing devices needs to print labels having a particular layout style. This might be because the labels need to be attached in a particular type of location. For example, the labels might be for attachment to goods of a particular shape or for use in an industrial environment which requires goods, equipment or parts of equipment such as wires to be labelled. In such a situation the user would want the characters to be set out in a particular way so that they can be easily seen when the label is attached. Furthermore, particular margins might be required for use in fastening the label to a part of the goods or equipment so that the printed characters can be seen.

Although it is sometimes possible to create particular label layout styles using existing printing machines, this can be a time-consuming and awkward process for the user. On some machines, there are no layout styles as such directly available in the printer but instead the user must select each feature of the layout style individually e.g. label length, leading and trailing margin length, vertical or horizontal text orientation, text size. This might require several attempts to get the desired layout style for a particular application. Unless the layout style can then be stored, the whole process would need to be repeated for each time the layout style is required and for different applications requiring different layout styles. On other machines, such a layout style is accessible only through a menu system and would therefore require several key presses to access.

It would be desirable to provide a more efficient way of creating a label to a particular layout style specification and to allow a particular layout style to be repeatedly accessed on different occasions. It would also be desirable to allow a different set of layout styles to be easily available on a tape printer in dependence on the intended use of the tape printer.

Another problem with existing printing devices is that there are very frequently text content of labels which needs to be repeatedly printed. At present, this requires the user to enter the text for printing each time. Alternatively, some printing devices do have the availability to receive a label (including text) already created by a user for recall and use at a subsequent stage. This however uses up available writable memory (e.g. RAM) in the printer, particularly where a large number of repeatedly used text contents are required.

It would be desirable to provide a printing device which had less reliance on writable memory in such a situation.

SUMMARY OF THE INVENTION

According to a first aspect of the invention there is provided a printing device for printing labels comprising: a read-only memory in which are stored a plurality of label data entries, said label data entries having been preset and being unalterable by a user; a user input means having character selection keys and a plurality of direct access keys for selectively accessing respective label data entries; writable memory for holding information selected by a user at the user input means, including any label data entry accessed by one of the direct access keys; and a controller for accessing one of said label data entries responsive to selection of one of said direct access keys by a user and arranged to cause printing of a label using said label data entry.

A second aspect provides a method of printing characters on a label, the method comprising: receiving input information from a user input means which is usable to select characters and to access one of a plurality of label data entries prestored in a read only memory; accessing a selected one of said label data entries and characters selected at the user input means; generating print data from said characters and label data entry; and printing a label using said print data.

The label entry data can take the form of a complex label mode having a set of parameters, for example specifying a particular label layout style or format, or alternatively can take the form of a predefined text string. The label entry data can take the form of a complex label mode having a set of parameters and additionally including a predefined text string. In the described embodiment, the accessed label data entry is transferred to writable memory, e.g. RAM, for formatting and printing. In the case of a predefined text string ("hot text"), the string is transferred to a text buffer in RAM. In the case of a complex label mode the parameters are transferred to a part of the RAM allocated for the format of the label.

The prestored label data entries are preferably preprogrammed into the read-only memory in accordance with the intended use environment of the device. It will be appreciated that they are unalterable by a user in normal operation of the device, but that there is the advantage that a user does not have to create them each time he wishes to use them. Moreover, he does not have to use up writable memory (RAM) in the device for storing them because they are always available from the read only memory.

According to a third aspect of the present invention, there is provided a printing device for printing labels comprising: a memory for storing one or more complex label modes, each complex label mode comprising a plurality of parameters; a user input means having character selection keys and at least one mode key for directly accessing at least one of said complex label modes; and a controller for accessing characters from the memory which correspond to characters selected at the user input means, and for accessing a complex label mode from the memory which corresponds to a complex label mode accessed at the user input means, and for generating data defining one or more of the plurality of parameters comprised in the said complex label mode, and arranged to cause printing of the selected characters in accordance with the accessed complex label mode including the defined parameters.

The modes can be directly accessed using either a single key press of a mode key or by using a shift key together with a mode key. Data defining parameters can be generated for example based on information input by a user or by means of calculation by the printing device.

According to a fourth aspect of the invention, there is provided a method of printing characters on a label in accordance with a complex mode, the method comprising the steps of: receiving input information from a user input means which is useable to select characters and to access one of one or more complex label modes pre-stored in a memory and comprising a plurality of parameters; accessing characters from the memory which correspond to characters selected at the user input means and accessing a complex label mode from the memory which corresponds to a complex label mode directly accessed at the user input means by a mode key; generating data defining one or more of the plurality of parameters comprised in the said complex label mode; and printing the selected characters in accordance with the accessed complex label mode including the defined parameters.

According to a fifth aspect of the present invention, there is provided a printing device for printing images, comprising: a memory for storing a plurality of complex label modes, each complex label mode comprising information for printing an image in accordance with the respective complex label mode and a plurality of parameters; user input means having one or more mode keys, each key for directly accessing one or more complex label modes to define an image to be printed by the printing device; a controller for accessing a complex label mode from the memory and for generating data defining one or more of the plurality of parameters comprised in the said complex label mode to cause printing of an image in accordance with an accessed complex label mode including the defined parameters.

According to a sixth aspect of the invention there is provided a printing device for printing labels comprising: a memory in which is stored a plurality of predefined text strings; a user input means having character selection keys and at least one direct access key for directly accessing one of said predefined text strings; and a controller for accessing characters from the memory which correspond to characters selected at the user input means, and for accessing a predefined text string from the memory which corresponds to a direct access key selected at the user input means, and arranged to cause printing of the predefined text string.

According to a seventh aspect of the invention there is provided a method of printing characters on a label, the method comprising the steps of: receiving input information from a user input means which is usable to select characters and to access one of a plurality of predefined text strings prestored in a memory; accessing the selected predefined text string; and printing the predefined text string wherein the memory is a read only memory and the predefined text string is transferred to a writable memory prior to printing.

BRIEF DESCRIPTION OF THE DRAWINGS

Embodiments of the invention will now be described, by way of example only, with reference to the accompanying drawings in which:

FIGS. 8a to 8c show examples of label layouts which can be produced by the printing device in accordance with different standard label modes;

FIGS. 9a to 9d show examples of label layouts which can be produced by the printing device in accordance with different complex label modes;

In the figures, like reference numerals indicate like parts.

DETAILED DESCRIPTION OF PREFERRED EMBODIMENTS

Figure 1:
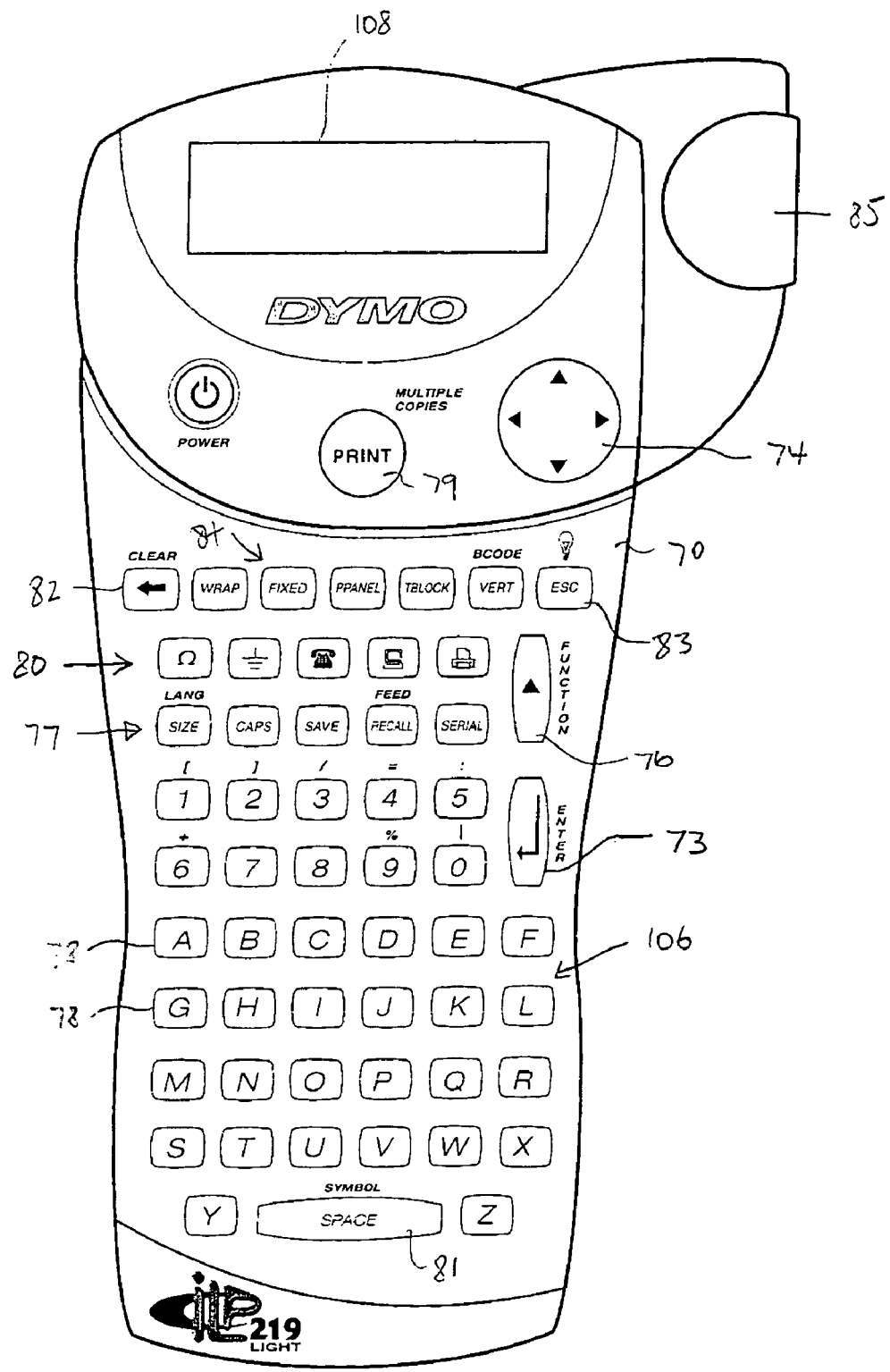
FIG. 1 is a schematic diagram of the front part of the casing of a printing device.

FIG. 1 illustrates the front of a tape printing device. Reference numeral 70 denotes the casework of the printer. The front of the printer carries a liquid crystal display (LCD) 108 and a keyboard 106 having a cursor control key 74, a shift key 76, and a plurality of character selecting keys 78. There is provided one character selecting key for each letter of the alphabet, and one key for each number from 0 to 9. Operands and punctuation are accessed using the shift key 76 and one of the number keys, each number key having an operand or punctuation mark printed above it which can be accessed in this way. The shift key 76 is not a toggle key and must therefore be held down when pressing another key with which it is being used in combination.

The keyboard also has a return key 73 and a number of function keys 77. In this embodiment the function keys 77 are (from left to right in the figure) a character size key, a caps lock key, a save key, a recall key, and a serial key. The shift key 76 together with the size key are useable to change the language. The default language is English but other languages can be chosen. The available languages are pre-stored in accordance with the intended market for the device. The shift key 76 can be used together with the recall key to feed tape. As is known, combinations of keys can be used in place of individual keys for each function. The keyboard 106 also has a print key 79, a delete key 82 and an escape key 83. The delete key 82 can be used on its own as a backspace key to delete the last-typed character, or together with the shift key 76 to delete all currently-entered text. The escape key 83 takes the user out of a function menu or an error message but leaves any currently-entered text.

A number of symbol keys 80 are provided on the keyboard 106. The keys shown are (from left to right in the figure) ohm, earth, phone, computer and fax. Other symbols can be accessed using a space key 81.

Finally, the keyboard 106 has a number of mode keys 84. These are used to select a mode in which characters entered are printed. This will be explained in more detail below.

Thus the keyboard 106 is used for inputting characters to the tape printing device and for carrying out various operations associated with creating a desired label. This could be achieved with other input means, for example a touch pad or a touch screen. As is known, the character selecting keys 78 allow characters to be selected by a user to formulate labels to be printed. The terms "characters" and "text" in the following refer to numerals, symbols, icons, background patterns, barcodes and similar as well as letter characters, which together may make up an image to be printed on a label. The various other keys allow different functions to be implemented, and in effect control the operational modes of the printer.

The display 108 can display up to two lines of text. However the user can have up to four lines of text in a label being edited, and a pointer indicates which line is being edited. Other embodiments may be able to display more or less than two lines of text or allow more than four lines of editable text. The display 108 is illustrated more clearly in FIG. 10 displaying a two line label (L1) ESSELTE (first line) FILE 126 (second line). The text is displayed in a text area 109 of the display 108. The text area 109 takes up much of the display 108 but areas above and below and to the left of the display area 109 (collectively the message area 110) are used to display other information, as will be explained in more detail below.

The printer operates with a supply of tape on which images are printed. A cutter 85 is provided to cut off lengths of the tape after a label has been printed. This is a cutter can be manual or an automatic cutter that automatically cuts the tape after printing. The tape is housed in a cassette which is held in a cassette bay on the underside of the printer. The cassette could be located in a different location as necessary.

Typically, this tape printing device 1 is a hand held or small desk top device which is powered by batteries at least part of the time.

Figure 2:
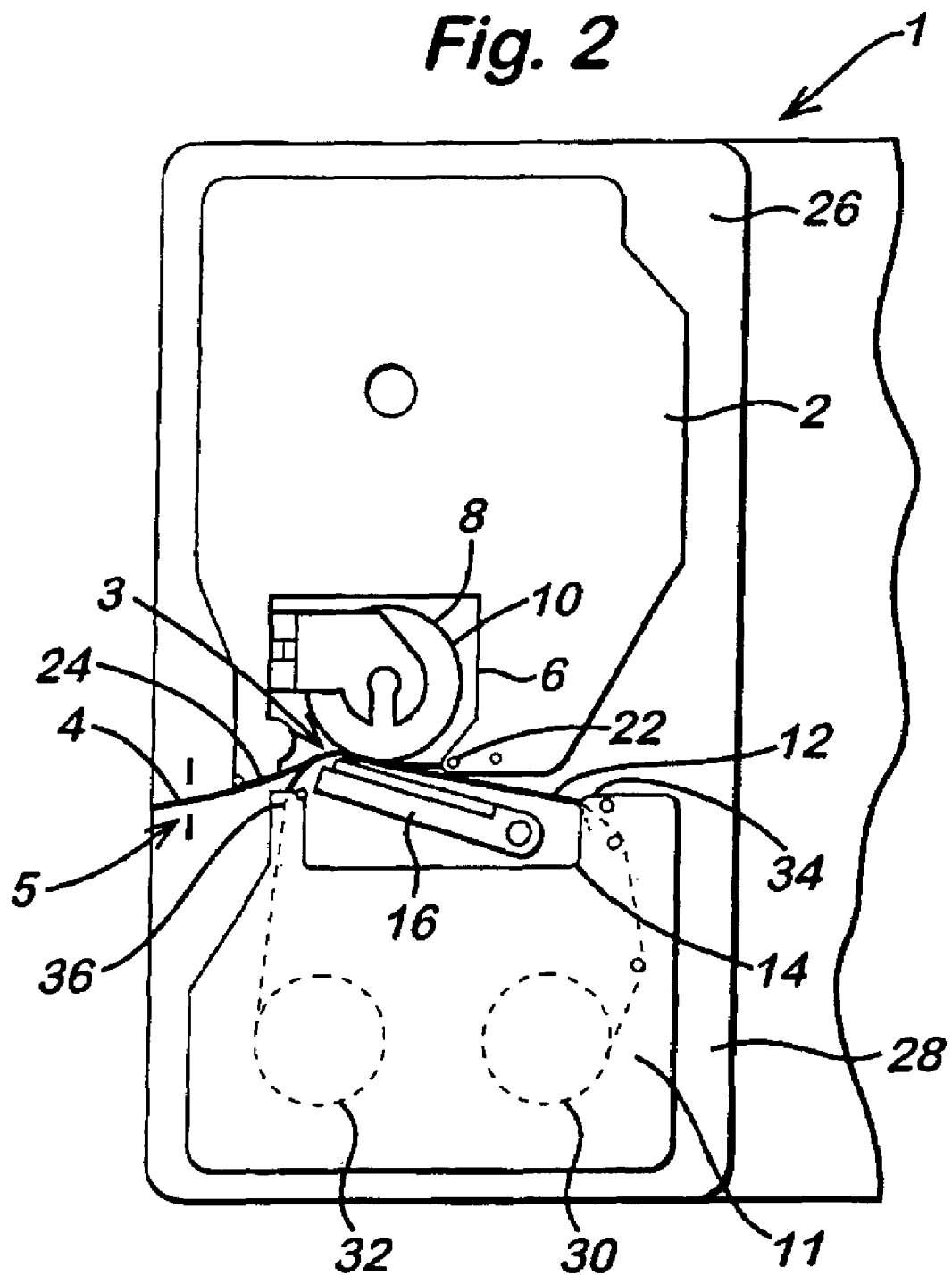
FIG. 2 is a plan view of part of a first tape printing device embodying the present invention, using a two cassette system.

FIG. 2 shows in plan view, with the outer casing depicted in FIG. 1 removed, a cassette receiving area of a first tape printing device embodying the present invention which has two cassettes arranged therein. The upper cassette 2 is located in a first cassette receiving portion 26 and contains a supply of image receiving tape 4 which passes through a print zone 3 of the tape printing device 1 to an outlet 5 of the tape printing device 1. The image receiving tape 4 comprises an upper layer for receiving a printed image on one of its surfaces and has its other surface coated with an adhesive layer to which is secured a releasable backing layer. The upper cassette 2 has a recess for accommodating a platen 8 of the tape printing device 1, and guide portions 22 and 24 for guiding the tape through the print zone 3. The platen 8 is mounted for rotation within a cage moulding 10. Alternatively, the platen could be mounted for rotation on a pin.

The lower cassette 11 is located in a second cassette receiving portion 28 and contains a thermal transfer ribbon 12 which extends from a supply spool 30 to a take up spool 32 within the cassette 11. The thermal transfer ribbon 12 extends through the print zone 3 in overlap with the image receiving tape 4. The cassette 11 has a recess 14 for receiving a print head 16 of the tape printing device 1 and guide portions 34 and 36 for guiding the thermal transfer ribbon 12 through the print zone 3. The print head 16 is movable between an operative position shown in FIG. 2, in which it is in contact with the platen 8 and holds the thermal transfer ribbon 12 and the image receiving tape 4 in overlap between the print head 16 and the platen 8 and an inoperative position in which it is moved away from the platen 8 to release the thermal transfer ribbon 12 and image receiving tape 4. In the operative position, the platen 8 is rotated to cause the image receiving tape 12 to be driven past the print head 16 and the print head 16 is controlled to print an image on the image receiving tape 4 by thermal transfer of ink from the ribbon 12.

Figure 4:
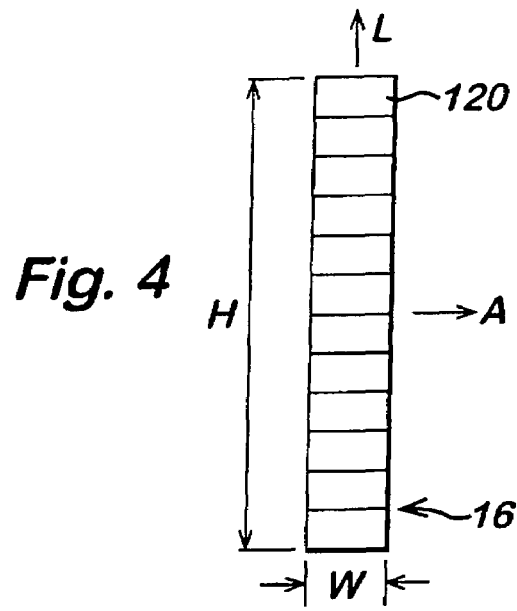
FIG. 4 shows a schematic view of the print head of FIG. 2 or FIG. 3.

The thermal print head 16 is shown in FIG. 4 and comprises a column of printing elements 120. The print head 16 has a height H which is large enough to print on the widest width of tape. The print head 16 has a width which is equal to the width of one printing element. Each of the printing elements is activatable separately and is activated in accordance with the desired image to be printed. An image can be printed with the width of the characters extending along the length of the tape, or with the height of the characters extending along the length of the tape (vertical printing).

The tape printing device 1 has a lid (which is not shown) but which is hinged along the rear of the cassette receiving portions 26 and 28 and which covers both cassettes when in place.

A DC motor 7 (see FIG. 5) continuously drives the platen 8. The platen is arranged to drive the image receiving tape 4 through the print zone 3 by the actuation of its own rotation.

The image is printed by the print head 16 on the image receiving tape on a column-by-column basis with the columns being adjacent one another in the direction of movement of the tape 4.

Figure 3:
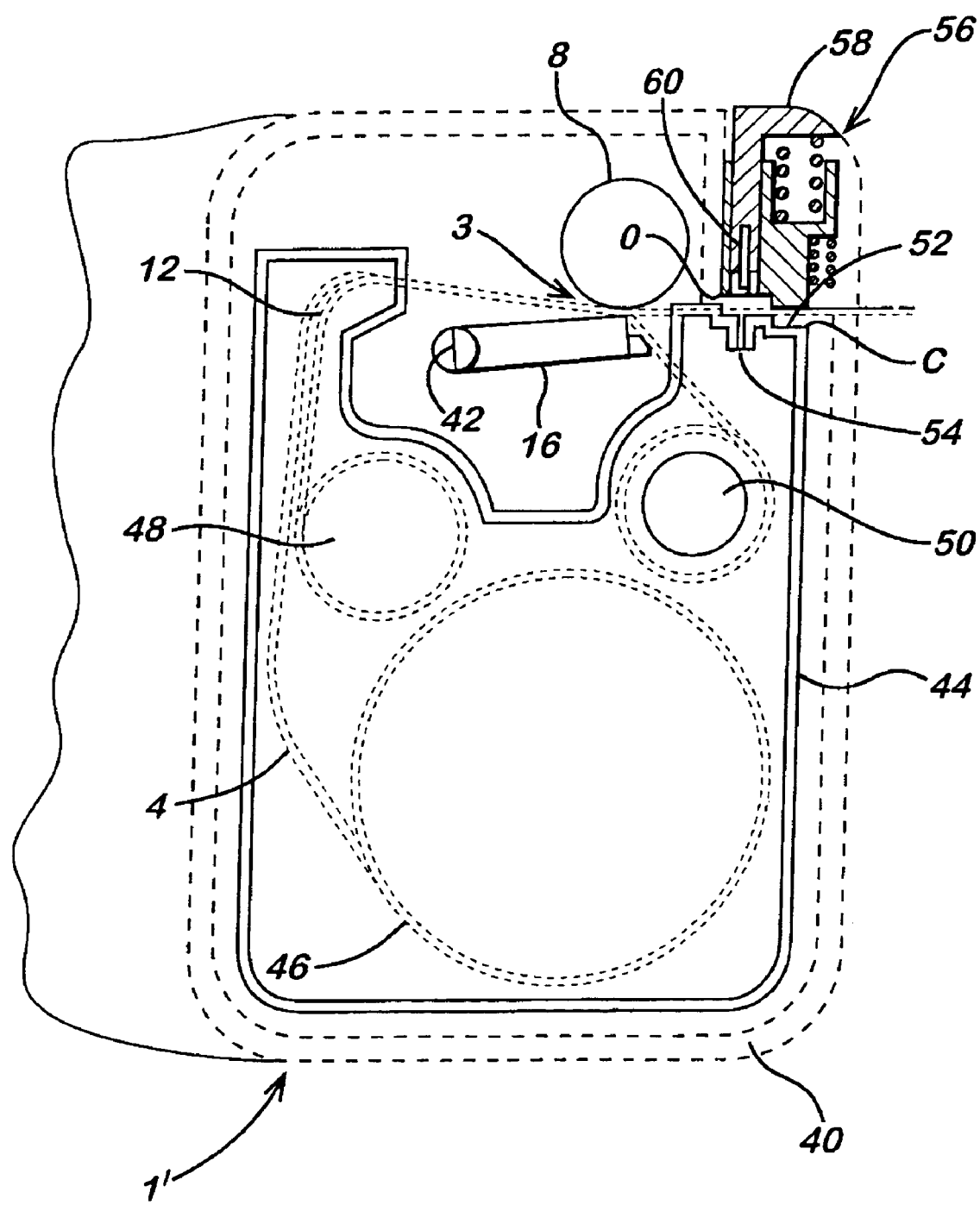
FIG. 3 is a plan view of part of a second tape printing device embodying the present invention, using a one cassette system.

FIG. 3 illustrates in plan view part of a second printing device 1' embodying the present invention which uses a one cassette system. It has its outer casing as depicted in FIG. 1 removed. The cassette bay is shown by the dotted line 40. The cassette bay 40 includes a thermal print head 16 and a platen 8 which cooperate to define a print zone 3. The thermal print head 16 is the same as that discussed in relation to FIG. 2 and shown in FIG. 4.

The print head 16 is pivotable about a pivot point so that it can be brought into contact with the platen 8 for printing and moved away from the platen 8 to enable the cassette to be removed and replaced as in the first embodiment. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, out of the cassette 44 through an outlet O past the print zone 3 to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive the image receiving tape through the print zone 3 continuously during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference numeral 52. A slot 54 is defined in the wall portion 52 and the image receiving tape 4 is fed past the print zone 3 to the cutting location C where it is supported by facing wall portions on either side of the slot 54.

The second tape printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

Figure 5:
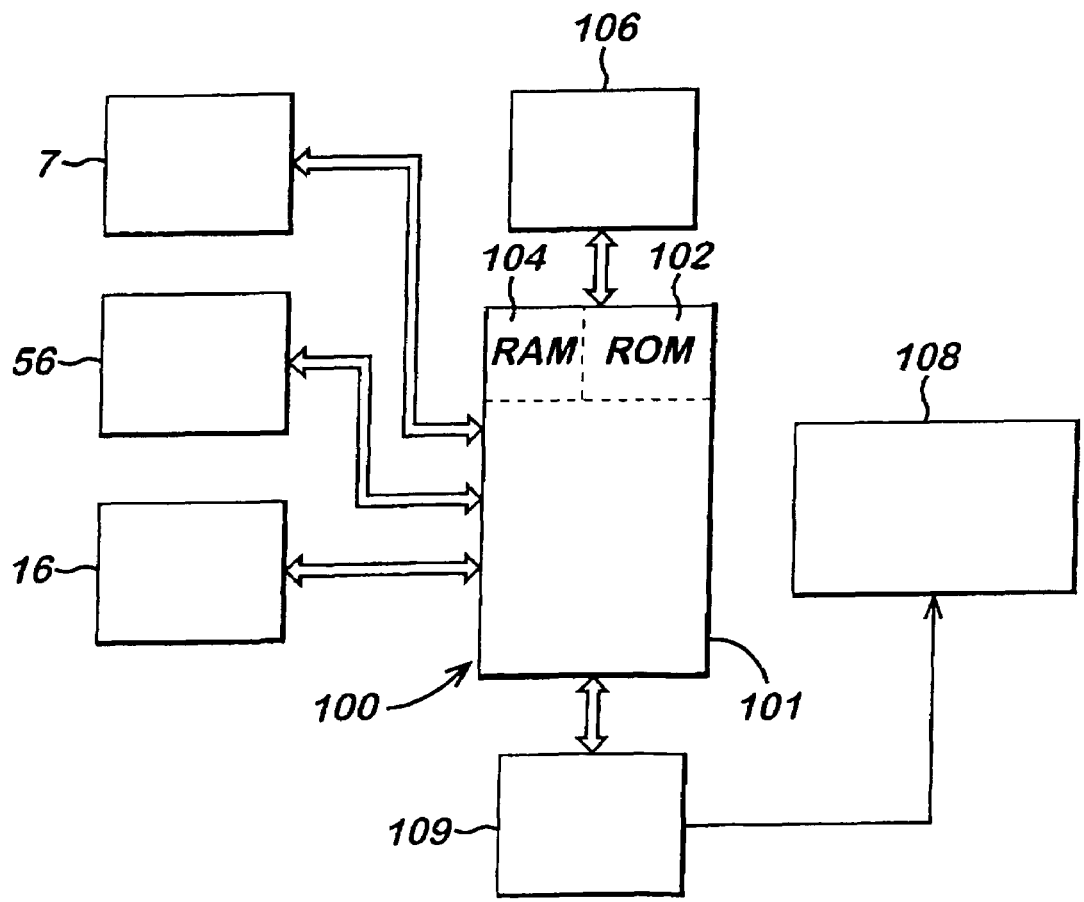
FIG. 5 is a diagrammatic sketch showing the control circuitry for the printing device of FIG. 2 or of FIG. 3.

Basic circuitry for controlling the tape printing device 1 of FIG. 2 or the tape printing device 1' of FIG. 3 is shown in FIG. 5. There is a microprocessor chip 100 having a read only memory (ROM) 102, a microprocessor 101 and random access memory capacity indicated diagrammatically by RAM 104. The microprocessor chip 100 is connected to receive label data input to it from a data input device such as keyboard 106. The microprocessor chip 100 outputs data to drive the display 108 via a display driver chip 109 to display a label to be printed (or a part thereof) and/or other information such as a message for the user. The display driver alternatively may form part of the microprocessor chip. Additionally, the microprocessor chip 100 also outputs data to drive the print head 16 so that the label data is printed onto the image receiving tape to form a label. Finally, the microprocessor chip 100 also controls the motor 7 for driving the platen. The microprocessor chip 100 may also control the cutting mechanism 56 of FIG. 3 or a cutting mechanism of FIG. 2 to allow a length of tape to be cut off. In alternative embodiments at least part of the cutting mechanism may be manually operated.

The type of print head 16 with which embodiments of the present invention are concerned is shown in FIG. 4 and generally comprises a plurality of printing elements 120 which are selectively heated to allow thermal printing to take place. The thermal printing can be directly onto thermally sensitive image receiving tape 4 or can be by means of an ink ribbon 12 such as shown in the embodiments of FIGS. 2 and 3. As discussed in relation to these embodiments, the ink ribbon 12 is arranged between the print head 16 and the image receiving tape 4. The application of heat to the ink ribbon 12 by selected printing elements 120 of the print head 16 causes an image to be transferred to the image receiving tape. Each printing element 120 is generally square to print a square pixel on the image receiving tape. However, the printing elements may be rectangular or the like.

Each printing element 120 is a resistive element which, when current is passed therethrough is heated up. The printing elements 120 are selectively heated so as to allow an image to be printed on the image receiving tape 4 as it passes the print head 16. The image printed on the image receiving tape 4 is defined by a plurality of contiguous or adjacent columns of pixels. Thus the image printed on the image receiving tape 4 depends on which printing elements 120 are activated or heated and when. The image receiving tape 4 moves generally in the direction of arrow A, that is in the length wise direction of the image receiving tape 4 and perpendicular to the longitudinal axis L of the print head 16.

The schematic representation of the print head shown in FIG. 4 has twelve printing elements. In practice, the print head will have many more printing elements, for example 128. The print head 16 will generally have a height H slightly less than the width of the image receiving tape 4 to be used with the tape printing device 2. Where more than one width of tape is to be used with the tape printing device 2, the print head 16 will generally have a height H corresponding to the width of the largest image receiving tape 4 to be used with the tape printing device 12. Generally, the width W of the print head is equal to the width w of one printing element 120 to thereby form a column shaped print head 16.

Figure 6:
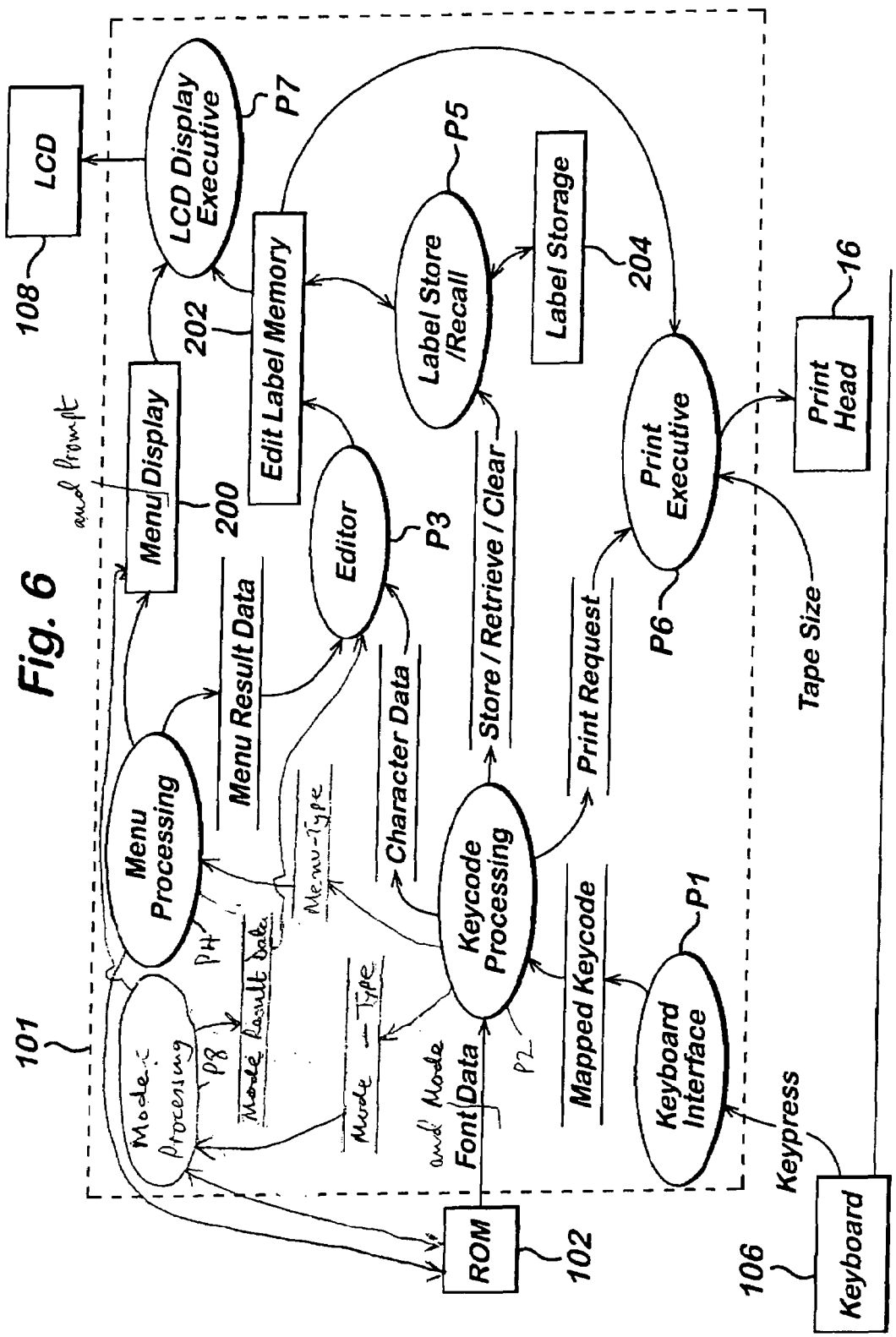
FIG. 6 is a diagram illustrating some of the control components of the printing device in greater detail.

FIG. 6 illustrates some of the control components of the printer as shown in FIG. 5. The sketched line 101 represents the print controller, and in this embodiment it is the microprocessor 101 which is depicted in FIG. 5, although it need not necessarily be a microprocessor. The circles within the controller 101 denote program components which are run within it to implement different control functions as described in the following. The controller 101 includes the RAM 104. In practice, the RAM 104 may be implemented on the same chip as the processor, or be provided as a separate chip connected to the controller 101. The blocks labelled 200, 202, 204 represent portions of the RAM 104. The block 200 is a menu and prompt display portion, the block 202 is an edit label memory portion and the block 204 is a label storage portion. In addition, the controller 101 contains or is associated with the ROM 102 which holds font data for the characters and mode data. Part of the structure of the ROM 102 will be described more fully below. The controller 101 controls operations of the display 108 and supplies print data to the print head 16. It receives inputs from the ROM 102 and the keyboard 106.

The controller 101 runs a number of different programs to control operations of the printer. A keyboard interface program P1 receives key presses from the keyboard 106 and provides mapped key code data to a key code processing program P2. The key code processing program P2 has a number of different functions. Firstly, it receives the font and mode data from the ROM 102. It supplies menu-type data to a menu processing program P4 depending on the menu which is selected by keys such as the function keys 76 of the printer. It also supplies character data to an editor program P3 depending on the characters selected by the character selection keys 78 of the keyboard 106. It supplies mode-type data to a mode processing program P8 depending on the mode which is selected by the mode keys 84. It further supplies label store/recall functions to a label store/recall program P5. Finally, the key code processing program P2 supplies print request data to a print executive program P6.

The menu processing program P4 supplies menu result data to the editor program P3, and in certain circumstances is in communication with the ROM 102. It also supplies menu display data for storage in the RAM portion 200. The editor program P3 acts on the menu result data and character data to formulate and edit a label which is stored in a working portion of the RAM 104, the edit label memory portion, labelled 202 in FIG. 6. This working portion 202 of the RAM 104 holds data defining the current label which is being formulated and/or edited, including the characters selected and the label mode.

The label store/recall program P5 is operable responsive to store/recall functions supplied from the key code processing program P2 to transfer label data between the working portion 202 of the RAM 104 and a storage portion (label store/recall portion) 204 of the RAM 104.

The print executive program P6 receives tape size information (discussed later) in conjunction with print requests from the keyboard and controls operation of the print head 16 based on the label data which is held in the working portion 202 of the RAM.

The mode processing program P8 supplies mode result data to the editor program P3, and is in communication with the ROM 102. It also supplies prompt display data for storage in the RAM portion 200 (examples will be explained below). The editor program P3 acts on the mode result data and character data to formulate and edit a label which is stored in a working portion of the RAM 104, the edit label memory portion, labelled 202 in FIG. 6. It may also act on menu result data as explained above, possibly in formulation and editing of a single label.

Finally, the controller 101 runs an LCD display executive program P7 which manages data to be displayed on the display 108 based on the contents of the menu and prompt display portion 200 of the RAM and the working portion 202 of the RAM.

The printer can accommodate tapes having a plurality of different widths, in particular 6 mm, 9 mm, 12 mm, 19 mm and 24 mm. A switch allows a selection to be made between three settings, 6 mm; 9/12 mm; 19/24 mm. The manner in which this switch cooperates with the printer is described in our earlier European Patent No. 0634274 and therefore is not discussed further herein. In any event it will be appreciated that any manner of conveying tape size information to the print executive program P6 may be used, and that different tape width choices are possible.

Figure 7:
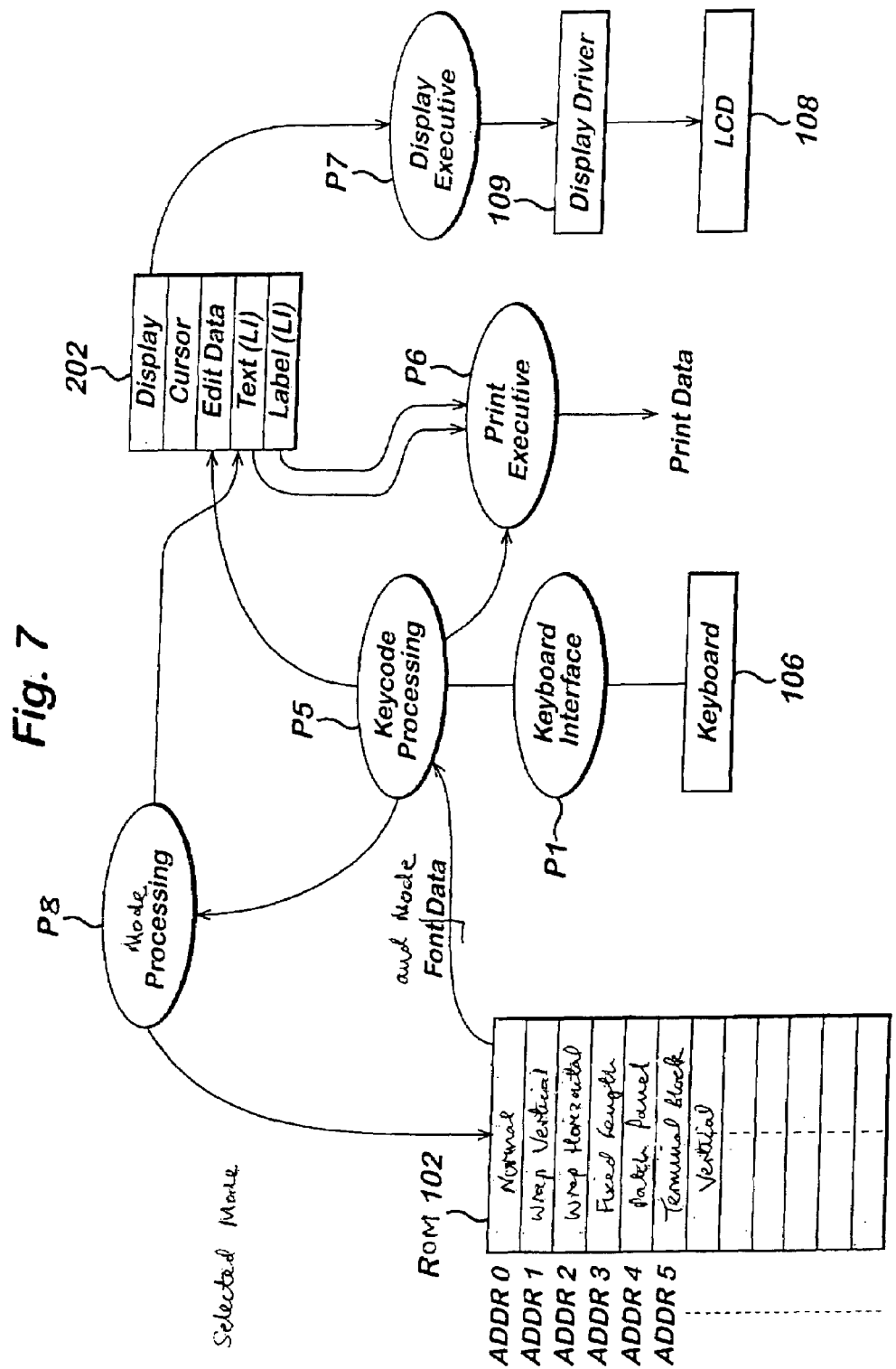
FIG. 7 shows some of the elements of FIG. 6 in more detail.

Label data is held in the working portion 202 of the RAM in different data structures as shown in FIG. 7. In particular, a text data structure label type (marked text in FIG. 7) holds text data regarding the characters and symbols etc. which have been selected for printing. The text data includes new page and new line information. An attribute data structure page setting type (marked label in FIG. 7) holds attributes with which the characters are to be printed, and effectively defines the layout style of the label, at least some features of which have been selected by the user as explained below. In addition, the working portion 202 of the RAM contains edit data including the position of a cursor as a file cursor type and display control information. At any time, label data and edit data for one label is held in the working portion 202 of the RAM.

The print executive program P6 generates print data for the print head as a sequence of columns of dot data based on the text data and attribute data. The edit data is not used for printing. The print executive program P6 does not formulate a complete dot pattern image of the label to be printed in RAM prior to printing. Instead, column data is prepared "on the fly". Thus, the print executive program P6 extracts text data from the text data structure and attribute data from the attribute data structure and manipulates this data to generate successive print columns. The print head 16 contains a buffer which holds one column of dot data, while the print head 16 itself prints a column of dot data at a time. Thus, while the print head 16 is printing one column, the next column can be placed in the buffer ready for printing. This technique is described in our earlier European Patent No. 0513290.

When a user is using the tape printing device to produce a label, the tape width must be selected from the choice described above. In this embodiment, the example of the creation of label L1 will be used. Once the selection of tape width has been made, there are also a number of possible character sizes which may be selected. The message portion 110 of the display 108 shows the current character size. The "size" key of the function keys 77 can be pressed to select a size menu. The cursor control key 74 can then be used to scroll down the menu to select the required character size. For a given tape width and number of lines of text there is a default character size which will be used in the absence of selection of a different size by the user. There are also some disallowed tape size-character size combinations because certain character sizes are too large for certain tape sizes, particularly if the user wishes to print with multiple lines.

Finally, the user can select a layout mode, as explained more fully below. In certain modes the user is not allowed to select the character size.

Figure 10:
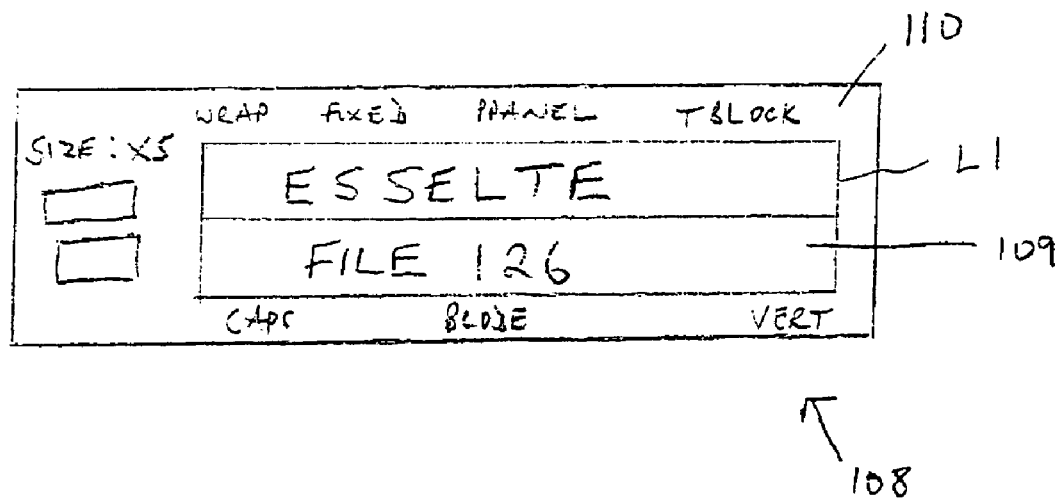
FIG. 10 shows the LCD display of the printing device of FIG. 2 or FIG. 3.

Once these choices have been made, the user can create the label L1 (as shown in FIG. 10) by typing in the characters using the character keys 78. Since the label L1 comprises uppercase letters, this can be achieved in one of two ways. Either the user can hold the shift key down whilst pressing the letter keys 78 for each letter or the caps lock function key can be pressed before the letter keys 78 are pressed. If the caps lock function key is pressed once, any letter keys 78 pressed afterwards result in production of uppercase letters on the display 108. The caps lock function key is a toggle switch, therefore if it is pressed a second time, any letter keys 78 pressed afterwards result in production of lowercase letters on the display 108. The numbers "126" are entered using the three number keys "1", "2" and "6". The return key 73 is used after the third "E" of "ESSELTE" to allow the two lines of text to be created the keyboard interface program P1 receives the keyboard presses from keyboard 106 and provides mapped key code data to the key code processing program P2. The key code processing program P2 supplies the character data to the editor program P3. The character size selection information and any other menu information is supplied from the menu processing program P4 to the editor program P3. Mode information is supplied from the mode processing program P8 to the editor program P3. The editor program P3 uses the character data and character size information to formulate the label. This formulated text data, including the return key information, is put into the text data structure label type in the working portion 202 of the RAM 104. The executive program P7 acts on the data in working portion 202 and drives the display driver 109 to display the data on the display 108.

In the case of the label L1, the mode information is "normal mode" which is anyway the default layout mode.

Referring to FIGS. 1 and 7, as explained above, a number of mode keys 84 are provided. These keys are provided for the user to access, mostly using just a single key press, one of a number of predetermined print modes. Any number of print modes can be provided on the machine, but in this embodiment the modes provided have been selected in accordance with the intended use of the tape printer. In this embodiment the intended use is a general industrial use. It is important to note that the parameters defining the modes are set in the ROM 102 at the factory or other point of manufacture of the printer. That is, they are not set up by a user and so do not use up capacity of the RAM 104.

Some of the mode keys 84 allow access to standard modes, whereas others of the mode keys 84 allow access to complex modes. Provision of the mode keys 84 allows direct access to both standard and complex modes. Direct access is either with a single key press of a mode key 84 or by pressing the shift key 76 together with a mode key 84. The complex modes allow a number of parameters to be calculated and/or set for the user, thus avoiding the need for the user to set each parameter individually. It will be clear that each complex mode is defined by parameters prestored in the ROM 102. Different intended uses typically require different complex modes.

The modes provided will now be explained.

Standard Modes (i) Normal Mode: This is the mode described above with reference to creation of the label L1. This is the default mode of the printer and will be used if the user does not select any other mode. The result is a label on which the text is printed along the length of the label, in accordance with the number of lines selected by the user. The length of the label is determined based on the longest line as explained above. The label is printed with the selected characters and character size using default character spacing. If no character size is selected, a default character size is used.

An exception to this operation is if only a small amount of text has been input such that the total length of the label (including leader and trailer) is less than a minimum length. In this case, the total length of the label may need to be increased in order to make it physically possible to remove a cut label from the tape printer.

A leader and trailer are automatically added to the label, at either end of the text, the text being centered along the length of the label.

FIG. 8a shows the layout of a label printed in normal mode. In this embodiment the leader and trailer are both set at 11 mm but of course a different length could be used.

(ii) Vertical Mode: The purpose of this mode is to allow the text to be printed vertically along the length of the tape and thus on the resulting label. An advantage of the tape printer of this embodiment is that this mode is entered with a single key press of the "vert" key of the mode keys 84. The cursor then appears and the user can enter the desired text. The label length depends on the text size selected as in normal mode.

A label layout for vertical mode is shown in FIG. 8b. A default leader and trailer are added and the text is centered along the length and width of the tape.

(iii) Fixed Length Mode: This mode allows the user to select a fixed length with which the label is to be printed. An example of implementation of fixed length mode is described in the applicant's co-pending European Patent Application No. 01300555.8. However, an advantage with the present embodiment is that fixed length mode is accessed by a single key press of the "fixed" key of the mode keys 84.

When the fixed key is pressed, a prompt is displayed:

↑1.5"

1.5" (or 40 mm) is the minimum label length in this embodiment. The user can increment this length upwards in increments of 0.25" using the cursor control key 74. The cursor control key 74 is configured such that when in this mode and the above prompt is displayed, each press of the upward or downward arrow of the cursor control key 74 increments the length by 0.25". In some embodiments the user could type in the desired length. Once the user has the desired fixed length on the screen, the length is selected using the enter key 73. The cursor then appears and the user can enter the text to be printed.

Upon pressing the print key, the microprocessor 101 determines whether the entered text will fit in the fixed length selected. If it will, the label is printed. If the text is too long, an error message is displayed. In this embodiment the error message displays by how much too long the text is for the fixed length. Other options are possible, such as displaying the total length of the current label or displaying a simple error message such as "too long". The user presses the escape key and can then either amend the text or amend the fixed length or both.

On the display 108, the word "fixed" appears in the message area 110 above the text area 109 of the display 108. The position of the word can be seen in FIG. 10.

A label layout in fixed length mode is shown in FIG. 8c. A standard leader and trailer of 11 mm are added, but these could be different in other embodiments.

Complex Modes (i) Wrap Vertical Mode: An intended use of this mode is to print a label which is suitable for wrapping around various types and sizes of cable, such that the text is visible. A number of lines of text can be printed, such that the various lines are visible sequentially around the cable after the label has been affixed to the cable. In order to access this mode, the user presses the "wrap" key of the mode keys 84. This single key press takes the user into wrap vertical mode. This mode works with all allowable text and tape size combinations.

When the user presses the wrap key, a prompt is displayed:

↑↓14-10 AWG

This prompt refers to a table through which the user can scroll using the cursor control key 74 in order to choose the cable to which it is intended to affix the label. The table in this embodiment is as follows:

| LCD Prompt | Label length | Max text Size (3 repeats) |
| --- | --- | --- |
| CAT X/COAX | 1.5" | Medium |
| 22-16 AWG | 1.5" repeated text | XS |
| 14-10 AWG | 1.5" repeated text | Small |

-continued

| LCD Prompt | Label length | Max text Size (3 repeats) |
|---|---|---|
| 8-4 AWG | 1.5" repeated text | Small |
| 3-1 AWG | 2.0" repeated text | Medium |
| 1/0-4/0 AWG | 2.5" repeated text | Medium |
| CABLE 3.0" | 3.0" repeated text | Large |
| CABLE 4.0" | 4.0" repeated text | Large |
| CABLE 5.0" | 5.0" repeated text | Large |
| CABLE 6.0" | 6.0" repeated text | Large |

The default choice is 14-10 AWG (Average Wire Gauge) cable, hence this is shown in the prompt. Other options are a coaxial cable and four different sizes of electrical cable. Having scrolled to the desired row of the table, the user presses the enter key 73 to select the cable of that row. At this point, the cursor appears and the user can enter the text of the label.

On the display 108, the word "wrap" appears in the message area 110 below the text area 109 of the display 108. The position of the word can be seen in FIG. 10. Although other words are shown in this figure, they would not actually be visible at this stage in the vertical wrap mode, but only become visible if selected in accordance with other modes. Although the text is to be printed vertically, the entered text appears as horizontal text on the display so it is convenient for the user to manipulate.

Having entered the text, the display prompts the user as to whether the entered text is to be repeated along the length of the label. If the user selects to repeat the text, when printed, the text is repeated as many times as the cable size will allow. This may mean repeating multiple lines of text, should multiple lines have been entered. The number of repeats is calculated by the microprocessor 101. Otherwise, the text is printed only once.

In this mode, the user is not allowed to select the character size, but instead this is calculated when the user presses the print key 79. The character size is calculated based on the tape size, the number of characters and the selected cable type. The size is calculated to best fit the text on the tape. For example, if too large a text size is used for a label to be affixed to a wire of a small cross-section, overlap of text can occur. If there are too many characters to be fitted on the tape for the given tape size and cable type, an error message appears: cannot fit. In other embodiments the error message could be different and could, for example, specify that too many characters have been entered.

Following the error message, the user presses the escape key 83, and the entered text and the cursor re-appear so that the user can then modify the text and try again to print. The user could reduce the number of characters, or put in a greater number of lines.

The number of characters that will fit across the width of the tape in a line of text depends on the number of characters selected and also on the particular letters/numbers/symbols selected. For example, if narrow characters such as the letter "I" are included, more characters may fit. Thus an important feature of the text sizing calculation in this and other modes is that actual character widths (plus the associated white space either side of a character) are used, rather than simply assigning an equal width to each character.

As with the standard normal mode, if the total label length including leader and trailer is shorter than a minimum label length, the length of the label is automatically increased to a minimum at which the cut label can be removed from the printer.

An example label layout in wrap vertical mode is shown in FIG. 9a. A leader is added to the label, which in FIG. 9a is 11 mm. The actual leader length is chosen in dependence on the selected cable type so that in use, there will not be an excessive length of unused tape. There is also a minimum leader length determined by the physical printing process and removal of a label from the tape printer. A short standard trailer of, in this embodiment, 2 mm is also added to improve appearance of the label, but this is not essential.

In use, the backing of the label is removed, leaving adhesive exposed on the rear face of the label (i.e. the face which does not bear the text). The leader is wrapped around the cable and the text is then wrapped onto the leader so that the text is visible around the cable. Thus it can be understood that it is desirable to choose the leader length in dependence on the cable type, such that there is not an excessive quantity of leader which is not required to attach the label to the cable. It can also be understood that the amount of allowable text is preferably limited in dependence on the circumference of the cable so that none of the text is obscured by other of the text or the trailer.

(ii) Wrap Horizontal Mode: This mode also has an intended use of affixing the label to a cable. It is particularly suitable for small diameter cables and for putting a large number of characters on a label, since there is no limitation to the number of characters in this mode. The mode is accessed by pressing the shift key 76 together with the wrap function key.

This mode is similar to the vertical mode, except in this embodiment the default character size is different and there is no calculation of maximum text length.

The label is applied to a cable as described with respect to wrap vertical mode, except a more common use for this mode is to wrap the label such that its length is oriented along the length of the cable, thus allowing a large character string to be visible along a cable. If multiple lines are entered, they will appear sequentially around the circumference of the cable. An example label layout in wrap horizontal mode is shown in FIG. 9b.

(iii) Patch Panel Mode: This mode is particularly useful to print labels to be serialized. An example use is a cabinet having a number of compartments or drawers. A label can be printed with a panel for each drawer identifying the contents. For example, a number of drawers may contain electrical resistors of increasing resistance. This mode allows one label to be printed to label all the drawers and therefore saves a user much time over having to print out a label for each drawer.

In order to access this mode, the user presses the "ppanel" key of the mode keys 84. The display 108 then shows the following prompt:

↑↓Δ=0,750"

0.750" is the default panel pitch. The cursor control key 74 is then used to increment or decrement this pitch to the desired value. In this embodiment the maximum pitch is 20". Once the desired panel pitch is shown on the display, the user presses the enter key 73. The cursor appears and text can be entered.

Having entered text, the display then prompts the user to select either "serialization" or "repeat". Thus the user can select to serialize each panel i.e. to increment along the panels, or to print the same text in each panel. Examples of serialization of letters are as follows:

| Text | panel0 | panel1 | panel2 | panel3 |
|---|---|---|---|---|
| AA | AA | AB | AC | AD |
| AA | AA | AB | AC | AD |
| AA | AA | BA | CA | DA |
| AZ | AZ | BA | BB | BC |
| ZZ | ZZ | AAA | AAB | AAC |
| AZZ | AZZ | BAZ | BBZ | BCZ |
| 1AA | 1AA | 1BA | 1CA | 1DA |
| 1ZZ | 1ZZ | 1AAZ | 1ABZ | 1ACZ |
| 1ZZ | 1ZZ | 1AAA | 1AAB | 1AAC |
| ZZZZZZ | ZZZZZZ | AAAAAAZ | AAAAABZ | AAAAACZ |
| 123 ZZ | 123 ZZ | 123 AAZ | 123 ABZ | 123 ACZ |
| 123 ZZ | 123 ZZ | 123 AAA | 123 AAB | 123 AAC |
| 123 ZZ | 123 ZZ | 124 ZZ | 125 ZZ | 126 ZZ |
| AA | aA | aB | aC | aD |
| AZ | aZ | aAA | aAB | aAC |
| AZZZ | aZZZ | aAAAA | aAAAB | aAAAC |
| AZZZ | aZZZ | aAAAZ | aAABZ | AACZ |
| Aa | aa | ab | ac | ad |
| Aa | aa | ab | ac | ad |
| Aa | aa | ba | ca | da |
| Az | az | ba | bb | bc |
| Zz | zz | aaa | aab | aac |
| Azz | azz | baz | bbz | bcz |
| 1aa | 1aa | 1ba | 1ca | 1da |
| 1zz | 1zz | 1aaz | 1abz | 1acz |
| 1zz | 1zz | 1aaa | 1aab | 1aac |
| Zzzzzz | zzzzzz | aaaaaaz | aaaaabz | aaaaacz |
| 123 zz | 123 zz | 123 aaz | 123 abz | 123 acz |
| 123 zz | 123 zz | 123 aaa | 123 aab | 123 aac |
| 123 zz | 123 zz | 124 zz | 125 zz | 126 zz |
| Aa | Aa | Ab | Ac | Ad |
| Az | Az | Aaa | Aab | Aac |
| Azzz | Azzz | Aaaaa | Aaaab | Aaaac |
| Azzz | Azzz | Aaaaz | Aaabz | Aaacz |

Thus serialization can be done for letters and numerically.

In this embodiment, the maximum number of panels is 20. However, in other embodiments, the maximum number could be greater. The user is prompted to select the number of panels to be printed.

On the display 108, the word "ppanel" appears in the message area 110 above the text area 109 of the display 108. The position of the word can be seen in FIG. 10.

When the user presses the print key 79 a label is printed in accordance with the selected panel pitch and text. Unless the user has selected a particular character size, either a default character size is used or, if it is determined that the default character size is too large for the text to fit, a smaller character size is calculated by the microprocessor 101. In some embodiments, a character size smaller than that selected by the user will be automatically used if the selected size is too large for the text to fit. Even using the smallest character size, it is possible that the text assigned to some or all of the panels is too long to fit in a panel. If the text is repeated, the text could be too long for all panels with the pitch as selected. If the text is serialized, it may be that higher numbers can not fit in the selected panel pitch. If this occurs, an error message appears and the user has an opportunity to correct the problem, either by reducing the amount of basic text or by increasing the panel pitch, or by using more lines.

An example of the patch panel label layout is shown in FIG. 9c (only four panels visible). In this embodiment a standard leader is added but no trailer. The panels are delimited with a line across the width of the label.

(iv) Terminal Block Mode: This mode is similar to the patch panel mode except the text is printed vertically in each panel. This mode is entered by pressing the "tblock" key of the mode keys 84. The procedure for creating a label is then as for the patch panel mode. In this case, the maximum character string length in a line of text is limited by the width of the label, as opposed to the panel pitch. However, the panel pitch limits the number of lines of text. This mode is useful for vertical labeling, for example of a number of areas of an industrial cabinet arranged vertically.

On the display 108, the word "tblock" appears in the message area 110 above the text area 109 of the display 108. The position of the word can be seen in FIG. 10.

A label layout for terminal block mode is shown in FIG. 9d (only four panels visible). As for patch panel mode, a leader is added but no trailer.

Having described various modes, the implementation of the modes in the RAM 101 will now be explained with reference to FIG. 6. When the keycode processing program P2 receives a signal from the keyboard interface program P1 that a mode key 84 has been pressed, it sends a mode-type signal indicating the mode selected to the mode processing program P8, which is then able to ascertain which mode has been selected. This could be either a standard mode or a complex mode. The mode processing program P8 then sends a notification to the ROM 102 in the form of a pointer to a particular address within the ROM 102, the address being dependent on the mode selected.

FIG. 7 shows diagrammatically some of the different addresses within the ROM 102. In the embodiment, ADDR 0 is for the normal mode and the pointer will point to this address by default. Similarly, ADDR 1 is for the wrap vertical mode, ADDR 2 is for the wrap horizontal mode, ADDR 3 is for the fixed length mode and so on.

Within each address of the ROM 102 is the information needed to operate a particular mode. This information includes layout information and information on prompts to be displayed, plus information on calculations of parameters to be made as required for the various modes. Thus all the information required to create a label in a particular mode, including text orientation, text size calculation, leader and trailer information, length information and whether panels are to be used, is stored with respect to each particular mode. It is transferred to a part of the RAM allocated for the format of a label. The information for a selected mode is retrieved from the ROM 102 by the mode processing program P8 and used to produce the mode result data and to send instructions to the menu and prompt display block 200. The mode result data is passed to the editor program P3 for use in editing the label.

It can be understood that the described printer allows a user to enter a number of label modes with, in most cases, a single key press. This is advantageous for the user because the number of keystrokes is greatly reduced. This is partly because of the provision of the mode keys 84 for direct access to the modes but also because of the structure of the ROM 102 which stores all the information relating to each type of mode. This latter feature avoids the need for the user to set up label length, text size, text orientation, paneling and margins etc. separately because all of these are dealt with, with minimal user input, by choosing an appropriate mode. In other words, each mode comprises a number of settable and/or calculatable parameters. The parameters comprised in each of the modes are as discussed above.

The number of available modes could be increased by increasing the number of mode keys 84 and/or by making extra modes accessible using the shift key 76 together with a mode key 84, as is done to access the wrap horizontal mode in the described embodiment.

It can be understood that the particular keystrokes and specific operation of the modes described is not essential, but that the precise operation can be varied in other embodiments. The invention is not limited to the particular modes described but many other modes could be envisaged and could be added to the ROM 102 in accordance with the intended use of the tape printer. For example, in a laboratory environment there might be a requirement to label test tubes. In this case, a different prompt giving different options would be shown on the display 108, and the leader would be calculated differently.

Figure 11:
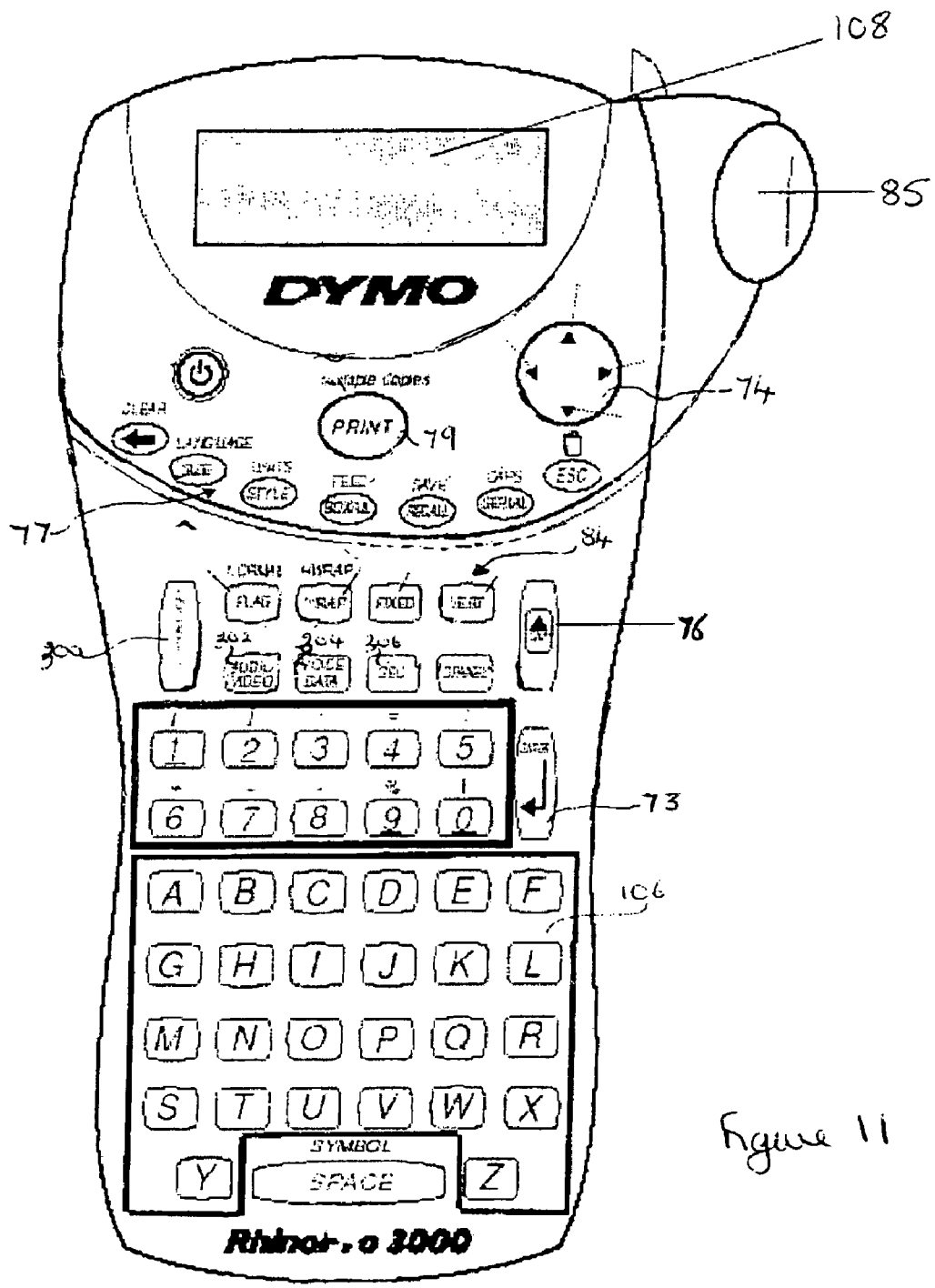
FIG. 11 is a schematic diagram of the front part of the case of a printing device in accordance with another embodiment of the invention.
Figure 12A:
FIGS. 12a to 12c illustrate the displays of predefined text strings.
Figure 12B:
Figure 12C:
Figure 13:
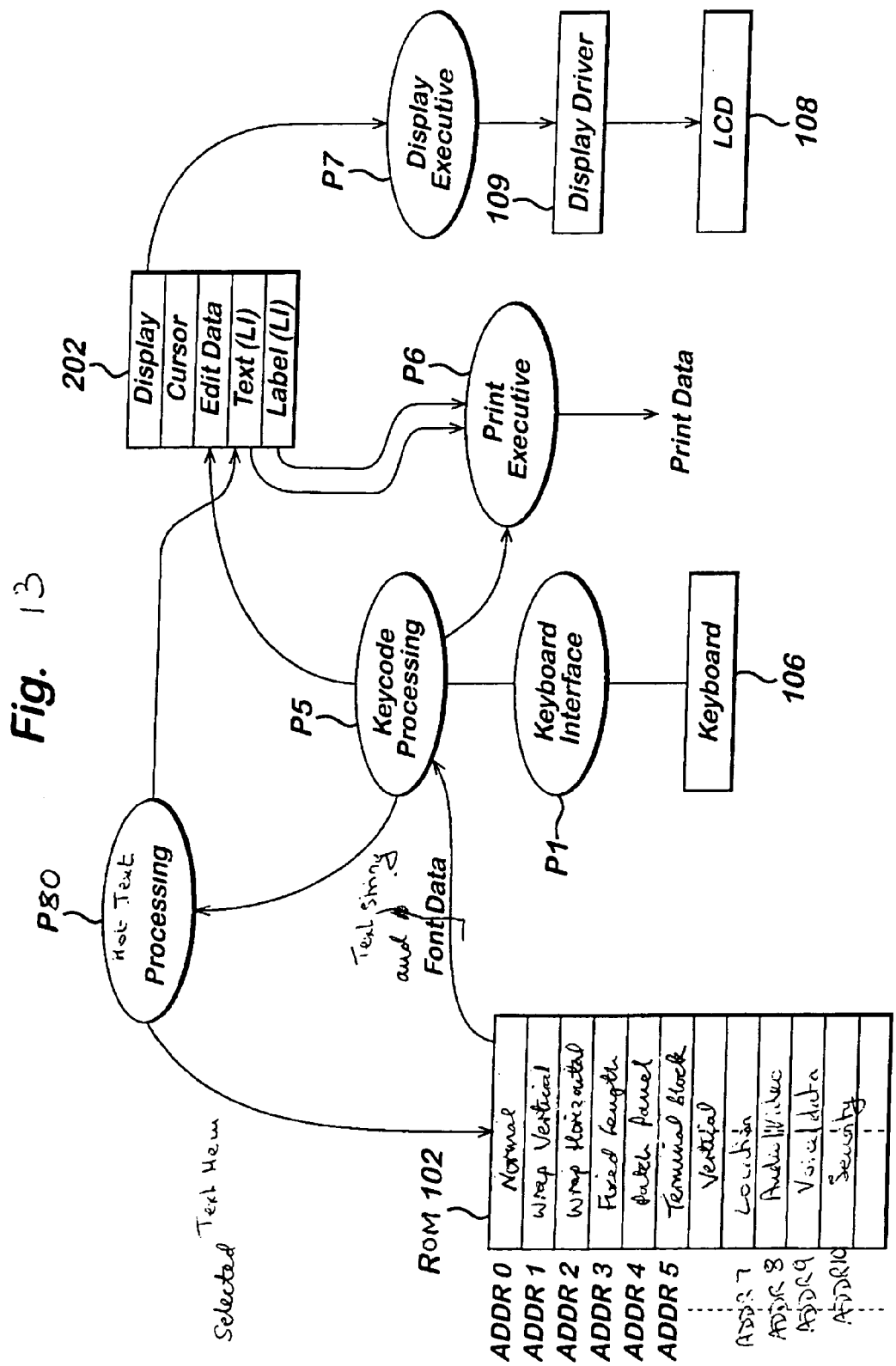
FIG. 13 shows implementation of direct access keys for predefined character strings in more detail.

Reference will now be made to FIGS. 11, 12 and 13 to describe another embodiment of the present invention. FIG. 11 shows the front of a label printer in which like parts denote like parts as in FIG. 1. The difference between the label printer of FIG. 11 and that of FIG. 1 is the existence of a plurality of text hot keys 300 to 306. Each text hot key is associated with a dedicated text string, which is stored in the ROM 102. Below each key, the matching symbols are grouped so that the user can select very easily directly the required text strings for printing labels.

The text hot keys are:

Location 300: containing text strings regarding location names

Audio/Video 302: containing text strings regarding audio or video items

Voice/Data 304: containing text strings regarding communication tools and electronic appliances Security 306: containing text strings regarding security items The content of each hot key is defined below. The screen displays marked with "X" indicate that the exact content of the screens (as each message has to fit the screen) still needs to be determined.

Text Hot Keys—Location Menu

The location menu (LOCATION key) contains following text strings:
(i) Home
Attic (screen: Attic)
Basement (screen: Basement)
Bath 1 (screen: Bath 1)
Bedroom 1 (screen: Bedroom 1)
Closet (screen: Closet)
Den (Screen: Den)
Dining RM (screen: Dining RM)
Family RM (screen: Family RM)
Foyer (screen: Foyer)
Garage (screen: Garage)
Guest Bath (screen: Guest Bath)
Guest Room (screen: Guest Room)
Kitchen (screen: Kitchen)
Laundry ROM (screen: Laundry RM)
Living RM (screen: Living RM)
Master Bath (screen: Master Bath)
Master Bedroom (screen: Master Bedroom)
Office (screen: Office)
Patio (screen: Patio)
Sunroom (screen: Sunroom)
Utility RM (screen: Utility RM
(ii) Office
Cubicle (screen: Cubicle)
Conference Room (screen: Conference Room)
IT Closet (screen: IT Closet)
Office (screen: Office)

The text strings of Home and Office are combined in one menu.

Test Hot Keys—Audio/Video Menu

The audio/video menu (AUDIO/VIDEO key) contains following text strings:

Extended Surround Left Speaker (screen: Ext.Surround LS)
Extended Surround Right Speaker (screen: Ext.Surround RS)
Front Centre Speaker (screen: FrontCent.Spkr)
Front Left Speaker (screen: FrontLeftSpkr)
Front Right Speaker (screen: FrontRightSpkr)
IR 1 (screen: IR 1)
Keypad 1 (screen: Keypad 1)
Outdoor Speaker 1 (screen: OutdoorSpeakerl)
Rear Surround Centre Speaker (screen: Rr.Surr.Cent.Spkr)
Rear Surround Left Speaker (screen: Rr.Surr.LeftSpkr)
Rear Surround Right Speaker (screen: Rr.Surr.RightSpkr)
Subwoofer 1 (screen: Subwoofer 1)
Subwoofer 2 (screen: Subwoofer 2)
Volume Control 1 (screen: Volume Control 1)
CATV (screen: CATV)
CD (screen: CD)
DVD (screen: DVD)
HDTV (screen: HDTV)
SAT TV (screen: SAT TV)
Tape (screen: Tape)
VCR (screen: VCR)

Text Hot Keys—Voice/Data Menu

The voice/data menu (VOICE/DATA key) contains following text strings:

Fax (screen: Fax)
Internet (screen: Internet)
Network (screen: Network)
Phone (screen: Phone)
Air Conditioner (screen: Air Conditioner)
Furnace (screen: Furnace)
Heat pump (screen: Heap Pump)
Humidifier (screen: Humidifier)

Text Hot Keys—Security Menu

The Security menu (SEC key) contains following text strings:

Back Door (screen: Back Door)
Camera (screen: Camera)
CCTV (screen: CCTV)
Front Door (screen: Front Door)
Sliders (screen: Sliders)

Menu Entry

After hitting one of these text string hot keys, the LCD will display one of the text strings available below the hot key. For "Location—Home", this can be e.g. one of the following screens of FIGS. 12a, 12b or 12c.

All enunciators are off. No cursor is shown, as would be the case in a conventional editor menu. The elevator and arrows are on.

When entering the hot keys for the first time (i.e. factory setting), the first text string will be shown.

When entering the hot key any subsequent time again (suppose the power was not cut in between), the last selected text string will be shown again.

All hot keys are alphabetically ordered.

Navigation

Use the up and down arrow keys to select a different symbol. The cursor "loops" up-down.

Pressing a letter jumps in the list to the option that starts with that letter. E.g. pressing the B-key (when in Location menu) jumps to "Basement". If multiple entries begin with that letter, then the machine jumps to the first one in the row.

Use the "ENTER" key to confirm selection. Back to the editor, the selected text string will be inserted at cursor position.

Use the "ESC" key to leave this menu and go back to the editor. No text string is inserted in the edit buffer.

Pressing the OFF key will switch off the machine. Same outcome as ESC.

Any other key will have no response.

FIG. 13 illustrates how the predefined text strings are stored in the ROM 102 at predefined addresses ADDR 7, 8, 9, 10. It will be appreciated that each address stores the appropriate hot key menu, with individual defined text strings stored at sub-addresses so that they can be recalled for printing based on the user selections as he navigates his way through the menu previously described. In principle, the mode of operation is similar to that which has already been described with reference to complex labels modes. That is, a hot text processing program PAT using the selected text menu (from the depressed hot key) to access the appropriate address in the ROM 102 and supply that information to the display. Once a user has navigated his way through the display, the appropriate selected text string data is recalled from the ROM 102 to a text buffer in the RAM for display and printing.

It is particularly important to note that because the hot text (predefined character strings) are stored in the ROM 102, the capacity of the writable RAM is not affected. Moreover, the user is provided with a number of preset factory options for his use without him having to enter them.

The invention is also not limited to the particular keyboard layout and provision of keys described, nor to the particular arrangements of the cassette receiving bay described or the particular control structure described.

The applicant draws attention to the fact that the present invention may include any feature or combination of features disclosed herein either implicitly or explicitly or any generalization thereof, without limitation to the scope of any of the present claims. In view of the foregoing description it will be evident to a person skilled in the art that various modifications may be made within the scope of the invention.

The invention claimed is:

1. A printing device for printing labels comprising:
a display;
a read-only memory in which are stored a plurality of label data entries, said label data entries having been preset and being unalterable by a user;
a user input having character selection keys and a plurality of direct access keys for selectively accessing respective label data entries, said label data entries each comprising a predefined character string, wherein actuation of one of said direct access keys causes a plurality of different predefined character strings to be displayed on said display, one of said displayed plurality of predefined character strings being selectable;
a writable memory for holding information selected by a user at the user input comprising a selected one of said plurality of predefined character strings; and
a controller for accessing one of said label data entries responsive to selection of one of said direct access keys by a user and arranged to cause printing of a label using said label data entry.

2. A printing device according to claim 1, wherein the predefined character strings are arranged in a location group, an audio/video group, a voice/data group, and a security group.

3. A printing device according to claim 1, wherein each label data entry is stored at a respective address in the read only memory, wherein the addresses are accessible by the controller.

4. A printing device as claimed in claim 1, wherein when said one of said direct access keys is actuated a subsequent time, the selected one of said predefined character strings is the first predefined character string to be displayed.

5. A printing device as claimed in claim 1, wherein said read only memory is arranged so that an address is associated with a predetermined one of said direct access keys and said plurality of different predefined character strings associated with said direct access keys are stored at respective sub addresses.

6. A method of printing characters on a label, the method comprising:
receiving input information from a user input which is usable to select characters and to select for access one of a plurality of label data entries prestored in a read-only memory said label data entries each comprising a predefined character string, wherein actuation of a direct access key of said user input causes a plurality of said predefined character stings to be displayed, one of said displayed plurality of predefined characters being selected;
accessing the selected one of said label data entries and the characters selected at the user input;
generating print data from said characters and label data entry; and printing a label using said print data.

7. A method according to claim 6, which comprises a step of transferring the selected characters and at least one label data entry into a writable memory prior to generation of print data.

8. A printing device for printing labels comprising:
a memory in which is stored a plurality of predefined text strings;
a user input having character selection keys and at least one direct access key for directly accessing one of said predefined text strings; and
a controller for accessing characters from the memory which correspond to characters selected at the user input, and for accessing a predefined text string from the memory which corresponds to a direct access key selected at the user input, and arranged to cause printing of the predefined text string.

9. A method of printing characters on a label, the method comprising the steps of:
receiving input information from a user input which is usable to select characters and to select one of a plurality of predefined text strings prestored in a memory;
accessing the selected predefined text string; and
printing the predefined text string, wherein the memory is a read only memory and the predefined text string is transferred to a writable memory prior to printing.

10. A printing device for printing labels comprising:
a memory in which a plurality of complex label modes are prestored, each complex label mode comprising a plurality of parameters;
a user input having character selection keys and a plurality of mode keys for selectively directly accessing said complex label modes; and
a controller for accessing characters from the memory which correspond to characters selected at the user input, and for accessing a complex label mode from the memory which corresponds to a complex label mode accessed at the user input, and for generating data defining one or more of the plurality of parameters comprised in the said complex label mode, and arranged to cause printing of the selected characters in accordance with the accessed complex label mode including the defined parameters.

11. A printing device according to claim 10, wherein a single key press of one of the complex mode keys selects a first complex label mode of the complex label modes.

12. A printing device according to claim 11, wherein the user input has further keys and a key press of one of the further keys and a single key press of the at least one complex mode key selects a second complex label mode from the complex label modes.

13. A printing device according to claim 12, comprising one complex mode key for each accessible complex mode or a pair of accessible complex modes.

14. A printing device according to claim 11, wherein complex label modes comprises one or more of: character size; character orientation; character font; label length; leader margin; trailer margin; number of lines; panel layout; panel pitch; number of panels; cable diameter; cable type; character string repeat; and character string serialization.

15. A printing device according to claim 14, wherein the controller is further arranged to, following access of a complex mode, cause display of a prompt for the user to select a value for one of the parameters comprised in the accessed complex mode.

16. A printing device according to claim 14, wherein the controller is further arranged to, following selection of a said value by the user, calculate at least one other parameters comprised in the selected complex label mode.

17. A printing device according to claim 11, comprising one complex mode key for each accessible complex mode.

18. A printing device according to claim 11, wherein the complex modes include wrap vertical orientation; wrap horizontal orientation; patch panel horizontal; and patch panel vertical.

19. A printing device according to claim 18, wherein the wrap vertical orientation complex mode is for printing a label to be affixed to an object of a particular dimension and for having characters printed in a vertical orientation along the length of an image receiving medium, and comprises one or more of the parameters: character size; character orientation; character font; label length; leader margin; trailer margin; number of lines; cable diameter; cable type; and character string repeat.

20. A printing device according to claim 19, wherein the printing device is arranged to, when a user accesses the wrap vertical orientation complex mode, prompt the user to select a cable type, and wherein the printing device is further arranged to, following selection of a cable type by the user, calculate one or more of the other said parameters.

21. A printing device according to claim 18, wherein the wrap horizontal orientation complex mode is for printing a label to be affixed to an object of a particular dimension and for having characters printed characters in a horizontal orientation along the length of an image receiving medium, and comprises one or more of the parameters: character size; character orientation; character font; leader margin; trailer margin; number of lines; cable diameter; and cable type.

22. A printing device according to claim 21, wherein the printing device is arranged to, when a user accesses the wrap horizontal orientation complex mode, prompt the user to select a cable type, and wherein the printing device is further arranged to, following selection of a cable type by the user, calculate one or more of the other said parameters.

23. A printing device according to claim 18, wherein the patch panel horizontal complex mode is for printing characters in a number of panels having the characters in a horizontal orientation along the length of an image receiving medium, and comprises one or more of the following parameters: character size; character orientation; character font; label length; leader margin; trailer margin; number of lines; panel layout; panel pitch; number of panels; cable diameter; cable type; character string repeat; and character string serialization.

24. A printing device according to claim 23, wherein the printing device is arranged to, when a user accesses the patch panel horizontal complex mode, prompt the user to select a panel pitch, and wherein the printing device is further arranged to, following selection of a panel pitch by the user, calculate one or more of the other said parameters.

25. A printing device according to claim 23, wherein the printing device is further arranged to, when a user accesses the patch panel horizontal complex mode, prompt the user to select one of repeat or serialization of characters.

26. A printing device according to claim 25, wherein the printing device is arranged to, if serialization has been selected, calculate a serialization increment for characters selected using the character selection keys.

27. A printing device according to claim 18, wherein the patch panel vertical complex mode is for printing characters in a number of panels having the characters in a vertical orientation along the length of an image receiving medium, and comprises one or more of the following parameters: character size; character orientation; character font; label length; leader margin; trailer margin; number of lines; panel layout; panel pitch; number of panels; cable diameter; cable type; character string repeat; and character string serialization.

28. A printing device according to claim 27, wherein the printing device is arranged to, when a user accesses the patch panel vertical complex mode, prompt the user to select a panel pitch, and wherein the printing device is further arranged to, following selection of a panel pitch by the user, calculate one or more of the other said parameters.

29. A printing device according to claim 28, wherein the printing device is further arranged to, when a user accesses the patch panel vertical complex mode, prompt the user to select one of repeat or serialization of characters.

30. A printing device according to claim 29, wherein the printing device is arranged to, if serialization has been selected, calculate a serialization increment for characters selected using the character selection keys.

31. A printing device according to claim 18, wherein each complex label mode comprises layout information for a label to be printed when that complex label mode is accessed.

32. A printing device according to claim 11, wherein the printer is arranged to print the selected characters in accordance with the selected complex label mode on a continuous tape.

33. A printing device according to claim 10, wherein the complex modes available for selection are pre-programmed into the device in accordance with the intended use environment of the device.

34. A printing device according to claim 10, further comprising a display configured to display selected characters and information relating to an accessed complex label mode.

35. A printing device according to claim 10, further comprising a cutter operable to cut the tape to form a label of the selected complex mode.

36. A printing device according to claim 35, further comprising a feeder controlled by the controller to feed the tape out of the printing device a distance such that operation of the cutter cuts the tape to form a label of the selected complex mode.

37. A method of printing characters on a label in accordance with a complex mode, the method comprising the steps of:

receiving input information from a user input which is useable to select characters and to access one of a plurality of complex label modes pre-stored in a memory, wherein each complex label modes comprise mode comprises a plurality of parameters and, said user input having a plurality of mode keys, each mode key being associated with a respective one of said complex modes for direct access of said respective complex mode;

accessing characters from the memory which correspond to characters selected at the user input and accessing a complex label mode from the memory which corresponds to a complex label mode directly accessed at the user input by the respective mode key;

generating data defining one or more of the parameters comprised in the said complex label mode; and printing the selected characters in accordance with the accessed complex label mode including the defined parameters.

38. A method according to claim 37, comprising the further step of storing characters and one or more complex label modes in a memory.

39. A printing device for printing images, comprising:

a memory for storing a plurality of complex label modes, each complex label mode comprising information for printing an image in accordance with the respective complex label mode and a plurality of parameters;

a user input having character selection keys and one or more mode keys, each mode key for directly accessing one or more complex label modes to define an image to be printed by the printing device; and a controller for accessing a complex label mode from the memory and for generating data defining one or more of the plurality of parameters comprised in the said complex label mode to cause printing of an image in accordance with an accessed complex label mode including the defined parameters.

\* \* \* \* \*

UNITED STATES PATENT AND TRADEMARK OFFICE
CERTIFICATE OF CORRECTION

| | | |
|---|---|---|
| PATENT NO. | : 7,284,920 B2 | Page 1 of 1 |
| APPLICATION NO. | : 10/933258 | |
| DATED | : October 23, 2007 | |
| INVENTOR(S) | : Douglas Waldal et al. | |

It is certified that error appears in the above-identified patent and that said Letters Patent is hereby corrected as shown below:

At Column 21, line 57, "characters printed characters" should be -- characters printed --.

At Column 23, lines 12-13, "modes comprise mode comprises" should be -- mode comprises --.

Signed and Sealed this

Thirteenth Day of May, 2008

JON W. DUDAS
*Director of the United States Patent and Trademark Office*